Jan. 7, 1936.　　　L. GOLDHAMMER　　　2,026,677

FOLDING CAMERA

Filed Sept. 10, 1934

Inventor:
Leo Goldhammer,
By Attorney
Philip S. Hopkins.

Patented Jan. 7, 1936

2,026,677

UNITED STATES PATENT OFFICE 2,026,677

FOLDING CAMERA

Leo Goldhammer, Munich, Germany, assignor to Agfa Ansco Corporation, Binghamton, N. Y., a corporation of New York Application September 10, 1934, Serial No. 743,458
In Germany September 12, 1933

3 Claims. (Cl. 95—44)

My present invention relates to a folding camera and more particularly to a folding camera provided with means for distance finding.

One of its objects is a camera of the above kind provided with an improved device for actuating a distance finder which device is efficient and simple in structure. Further objects will be seen from the detailed specification following hereafter. Reference is made to the accompanying drawing which shows a section through a folding camera according to this invention.

I have found that a particularly suitable control of a distance finder is possible by moving the whole bed of a folding camera for focussing. This movement is made use of for actuating the distance finder. The movement of the bed in the direction of the optical axis is produced by a milled knob which is rotatably mounted in the camera casing and causes the displacement of a slide mounted inside the camera casing, the bed and the lugs for erecting the lens mount being hinged to said slide. In such a construction the adjusting member of a distance meter can very easily be coupled with the device for focussing the camera.

The invention will now be described with reference to the accompanying drawing showing one form of construction according to the invention to which it is, however, not limited.

Figure 1:
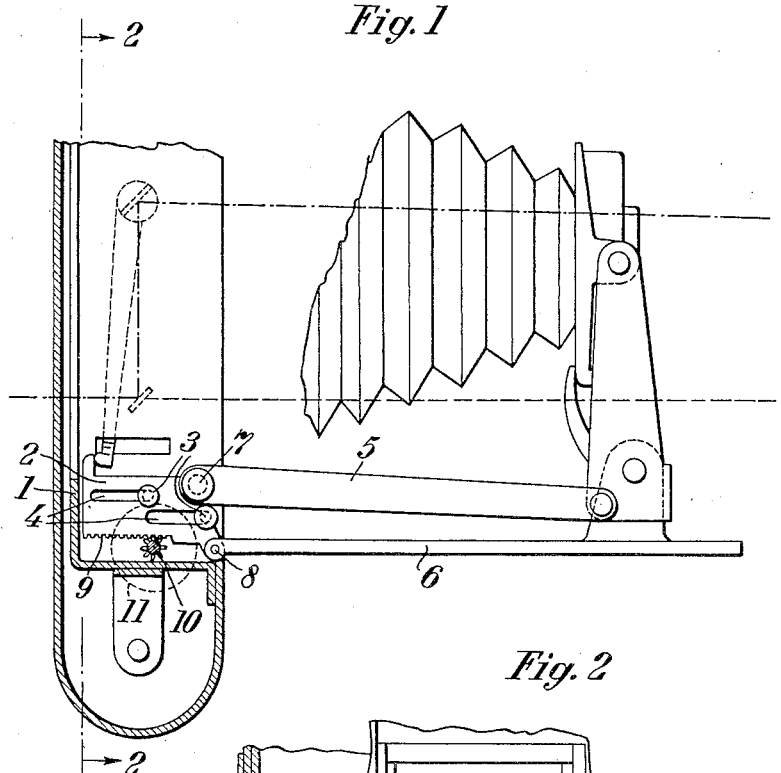
Figure 2:
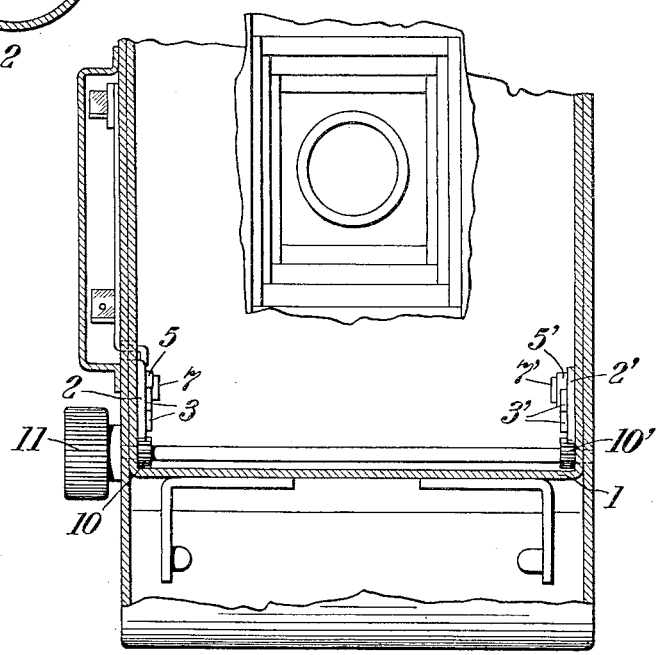

In the drawing, Fig. 1 is a fragmentary side elevation in partial section of an illustrative embodiment of the invention, and Fig. 2 is a fragmentary front elevation in partial section of the embodiment shown in Fig. 1.

Carriages 2 are slidably attached to the side walls of the casing 1. Rails, or pins 3 and slits 4 serve as guiding members. Lugs 5 for erecting the lens mount are hinged to the carriage 2. The axis 8 of the bed 6 is also mounted on the carriage 2. The lugs 5 are connected with the carriage 2 by joints 7. To the carriage 2 is also attached a rack 9 which is in gear with a toothed wheel 10 being connected with the milled knob 11. When turning the milled knob 11, in order to adjust the objective, the carriages 2 together with the lugs 5 and the bed 6 are moved in the direction of the optical axis. Any of the moved parts may be coupled with a member for controlling a distance finder. In the figure a recess of the carriage is coupled with a member for rotating one of the mirrors of a distance meter.

What I claim is:

1. In a folding camera in combination a casing having two side walls, a carriage connected with each of said side walls, a bed hinged to said carriages, means for shifting said carriages in the direction of the optical axis of said camera, a distance meter located in said casing and means for coupling said distance meter with said carriages.

2. In a folding camera in combination a casing having two side walls, a carriage connected with each of said side walls, a bed hinged to said carriages, lugs connected with said carriages for erecting the lens mount of said camera, means for shifting said carriages in the direction of the optical axis of said camera, a distance meter located in said casing and means for coupling said distance meter with said carriages.

3. In a folding camera in combination a casing having two side walls, a carriage connected with each of said side walls, a bed hinged to said carriages, lugs connected with said carriages for erecting the lens mount of said camera, a rack provided on said carriages, a shaft rotatably mounted in one of said side walls, two gear wheels mounted on said shaft and meshing with said racks, a milled knob fixed to the end of said shaft outside the casing, a distance meter located in said casing, and means for coupling said distance meter with said carriages.

LEO GOLDHAMMER.